United States Patent [19]
Morgan

[11] 3,973,274
[45] Aug. 3, 1976

[54] METHOD AND APPARATUS FOR MOUNTING AND POSITIONING MAGNETIC RECORDING HEADS

[75] Inventor: Samuel A. Morgan, Ann Arbor, Mich.

[73] Assignee: Sycor, Inc., Ann Arbor, Mich.

[22] Filed: Sept. 30, 1974

[21] Appl. No.: 510,471

[52] U.S. Cl. .............................. 360/104; 360/99; 360/103; 360/105
[51] Int. Cl.² ...................... G11B 5/54; G11B 5/60; G11B 21/10
[58] Field of Search ........... 360/104, 103, 109, 105, 360/99, 97–98, 86, 133; 346/137; 274/39 R, 39 A

[56] References Cited
UNITED STATES PATENTS

| | | | |
|---|---|---|---|
| 3,593,327 | 7/1971 | Shill .................................. | 360/133 |
| 3,810,243 | 5/1974 | McGinnis et al. ................... | 360/99 |
| 3,852,820 | 12/1974 | McGinnis et al. ................... | 360/99 |
| 3,855,622 | 12/1974 | Truscelli et al. .................... | 360/103 |

*Primary Examiner*—Alfred H. Eddleman
*Attorney, Agent, or Firm*—Price, Heneveld, Huizenga & Cooper

[57] ABSTRACT

A data recorder/reproducer device for flexible magnetic disc media, has a door-like structure mounted on a supportive frame. The door structure has a hollow interior which receives a recording disc, and is adapted to carry recording heads at each side of the disc. The heads may be articulated for selective controlled movement toward or away from the disc, into or out of transducing relation. The heads are also mounted for translational movement across the face of the disc, generally radially thereof. The device also includes novel linking means for connecting translational drive means to the heads to allow articulated movement of the heads and of the door-like structure without disturbing the translational position of the heads. Referencing means is also provided for positioning the heads with respect to the surface of the disc by establishing a reference position with respect to the door structure.

32 Claims, 6 Drawing Figures

METHOD AND APPARATUS FOR MOUNTING AND POSITIONING MAGNETIC RECORDING HEADS

BACKGROUND OF THE INVENTION

Quantity long-term data storage has long been accomplished on such media as magnetic tape and rigid magnetic discs, as well as punched paper cards and tape. More recently, the advent of flexible disc recording technologies have shown the advantages of the inexpensive limp or "floppy" flexible discs, typically made by coating the opposite sides of a thin highly flexible sheet of polymeric or other plastic film with magnetic oxide, with the coated disc being only on the order of 3 to 4 mils thick. This limply flexible disc is permanently enclosed within a close-fitting sleeve-like protective outer envelope, in which it may be rotated while the envelope is held in position. The envelope has an enlarged central opening for access to the center of the disc, and also has a radial slot opening, by which a magnetic head may access the face of the disc while the same is rotated. For example, the disc structure may be substantially as shown in U.S. Pat. No. 3,668,658 entitled MAGNETIC RECORD DISC COVER issued June 6, 1972 to Ralph Flores, et al., and one form of recorder/reproducer device for such a device is shown in U.S. Pat. No. 3,678,481 entitled DATA STORAGE APPARATUS EMPLOYING A SINGLE MAGNETIC DISC issued July 18, 1972 to Warren L. Daiziel, et al.

Previously-known recorders using flexible discs of the type just noted have not been sufficiently developed so as to have all, or even most of, the exceptionally great operational flexibility made possible by the flexible disc recording media; for example, such recorders have been limited to the use of a single disc and would only operate to record on one side of the disc, despite the presence on both sides of suitable magnetizable media, recording on both sides being possible only by physically withdrawing and inverting the disc. Furthermore, loading of the discs to the recording heads has been cumbersome and at times ineffective and even defective, involving the use of a variety of different types and arrangements of pressure pads and other such elements.

An improved recorder/reproducer apparatus for flexible disc recording, having greatly increased operational flexibility, greatly increased recording capacity, and considerably different structural characteristics from recorders used heretofore is shown in commonly assigned copending application Ser. No. 418,299 filed Nov. 23, 1973, now U.S. Pat. No. 3,913,137 and Ser. No. 529,489 filed Dec. 4, 1974 entitled METHOD AND APPARATUS FOR LOADING FLEXIBLE MAGNETIC RECORDING DISCS TO TRANSDUCING HEADS.

The apparatus disclosed in the above-mentioned commonly assigned copending applications is adapted to receive a pair of flexible disc elements, and to record on either or both sides of either of both such discs, as may be required. The apparatus includes at least two magnetic heads, and means mounting the same for articulated movement toward and away from their respective recording discs, as well as means mounting the heads for translational movement across the face of the discs while the same are rotated. A common drive means is provided by which both recording discs may be rotatably driven, as well as a common translational drive for the magnetic heads.

SUMMARY OF THE INVENTION

The present invention provides apparatus for mounting and positioning the recording head or heads in a data reproducer/recorder apparatus. More specifically, the invention is directed to novel linking and referencing means associated with the head for accurately positioning the head with respect at the same time to the disc while allowing or providing for relative movement therebetween. In one aspect of the invention, the referencing means includes a guide member extending parallel to an opening in the door-like disc-receiver through which the head extends when in transducing position, together with other elements including carrier means supporting the head and slidably movable along the guide member, upon which the head may be made shiftable into and out of transducing relationship. The guide means and carrier means cooperatively provide reference surfaces relative to the transducing position relationship between the disc and recording head.

In another aspect of the invention, novel linking means couples the translational drive means to the head and carrier means. The linking means is relatively rigid in compression and tension, at least under loading applied in use of the device, for moving the head along the guide without variation, and is relatively flexible in bending, whereby the carrier and head may be moved between transducing and non-transducing positions, and the disc-receiver moved between open and closed positions, without disturbing the basic translational position and relationship of the head, carrier and guide.

The foregoing major attributes of the invention, together with the advantages thereof, as well as other important attributes and advantages, will become more apparent following consideration of the ensuing specification and the accompanying drawings illustrating a preferred embodiment thereof.

DESCRIPTION OF A PREFERRED EMBODIMENT

Figures 1, 2:
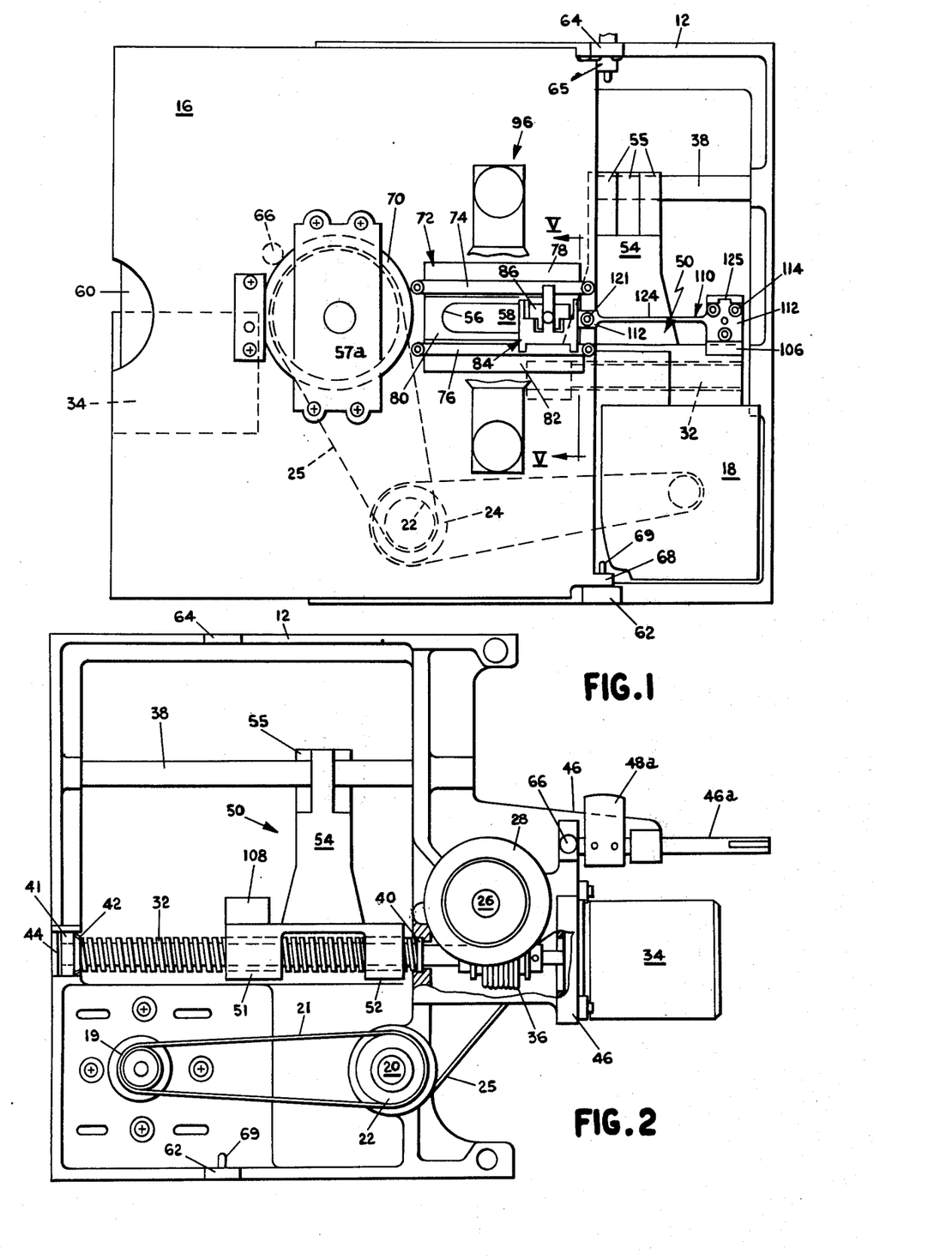
FIG. 1 is a side elevational view of a data recorder/reproducer apparatus incorporating the novel referencing and linking means of the invention.
FIG. 2 is a side elevation similar to FIG. 1, showing the opposite side and with the disc-receiver removed to show the frame.
Figure 3:
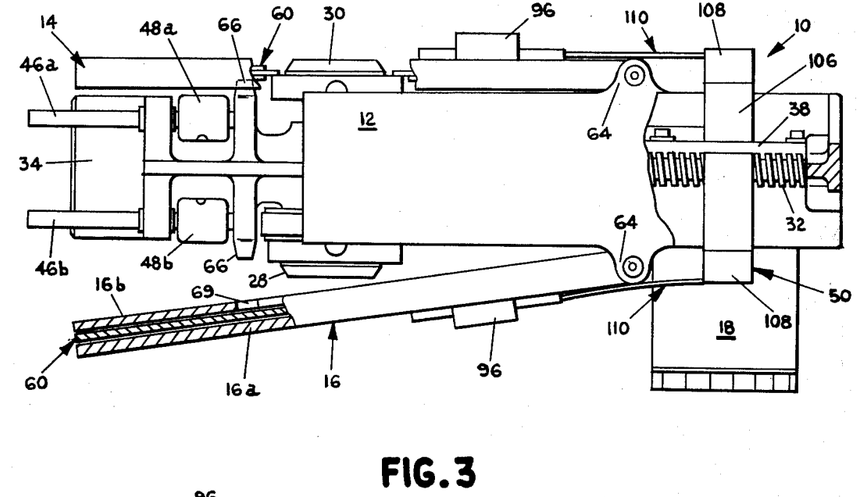
FIG. 3 is an overhead plan view of the apparatus of FIG. 1, showing one disc-receiver open for receiving a disc.

The recorder 10 in which the novel mounting and positioning means of the invention is incorporated includes an upright central frame 12 which carries a pair of disc-receivers 14 and 16 which are pivotally hinged on either side of the frame, similar to doors (LFIGS. 1 and 3). The frame 12 thus defines what may be referred to as the central plane area of the recorder device, i.e., the generally planar central area sandwiched between the disc-receivers 14 and 16, which are generally parallel when in their closed positions. Also, the frame 12 mounts many of the operative components of the device, including a drive motor 18, a jack shaft 20 having hubs or pulleys 22, 24 on either side of the frame, a drive shaft 26 having drive hubs 28, 30 at either end thereof, and an elongated lead screw or worm 32, together with a stepper motor 34 which drives lead screw 32, through a coupling 36 which will compensate for any alignment tolerances. Also, the frame 12 mounts a straight, smooth guide rod 38 (FIG. 2) above and parallel to lead screw 32.

The worm 32 is securely supported at each end, being mounted in bosses machined in either side of the frame 12, in which bearings 40, 41 are seated (FIG. 2). Bearing 40 seats against an internal shoulder inside its boss, and the worm is spring-loaded toward the latter (i.e., toward the right as seen in FIG. 2) by a wave-type spring thrust washer 42 disposed between the end portion of the worm and bearing 41, the latter being held firmly in position by a split retaining ring 44. Stepper motor 34 mounts upon a machined pad 46 formed as an integral part of frame 12, with the coupling 36 thus floating between the rigidly mounted motor and worm. Stepper motor 34 may be a conventionally-available member, for example, a 15° incremental stepper.

A traveling motion translator or follower device 50 is threaded on worm 32 to be moved thereby, upon rotation of the worm by the stepper motor 34. The translator or follower 50 has a pair of spaced, internally threaded, worm-receiving bosses 51, 52 which engage the worm threads, and these bosses are each preferably long enough to engage several turns of the worm thread. Follower 50 has an upstanding guide portion 54 with mutually-spaced finger-like projections 55 at the top, which slidably engage opposite sides of guide rod 38, to prevent rotation of the follower with the worm and thereby cause longitudinal translation of the follower when the worm is rotated. Tracking accuracy is facilitated by accurate translational movement of the follower along the worm, as well as by positional stability of the worm.

The disc-receivers 14, 16 each comprise, in effect, a pair of generally rigid plate-like portions 14a, 14b, 16a, 16b (FIG. 3), fixedly secured together to define a narrow, slot-like space 16c (FIG. 5) therebetween for receiving a flexible disc assembly 60 or other such recording media. That is, as mentioned above, the apparatus of the invention is particularly useful with a flexible disc assembly 60 of the type described previously, but it is to be noted that in the broader aspects of the invention, apparatus in accordance therewith is certainly effctively usable with other forms of disc recording media. Also, it should be understood that the term "recorder/reproducer" is used herein to mean a device which will provide either or both such functions.

In the present embodiment, the disc assembly 60 includes a flexible recording disc 58 within a narrow envelope having side 57a, 57 b (FIG. 6) which are typically square in shape, having corners which closely fit within interior corners of the receivers 14 and 16 to provide for initial positioning of the recording disc itself and to preclude rotation of the envelope upon rotation of the disc during recording or reproducing operation.

The two receivers 14 and 16 are each pivotally mounted upon the frame 12 in a manner providing very accurate referencing of the receivers with respect to certain other portions of the device, e.g., the drive hubs 28 and 30. For this purpose, the frame 12 has a pair of pivot pin bosses 62 and 64 (FIGS. 1, 2 and 3) disposed at the top and bottom thereof, as well as outwardly-projecting alignment posts 66, the latter being located as close as practical to the axis of drive shaft 26. Lower pivot pin boss 62 has an accurately-located upper surface which provides a pivot support for the lower corner of the disc receivers, by the direct contact therewith of a lower pivot boss 68 (FIG. 1) on the receivers, there being an appropriate upstanding pivot pin 69 from each of the bosses 62 for engaging an aperture in the disc receiver boss 68. The upper pivot boss 64 on the frame does not precisely guide or position the receivers, however, there being instead a nominal clearance therebetween, with a wave-washer 65 (FIG. 1) to provide downward spring-biasing of the upper rear corner of the receivers, to maintain referencing of pivot bosses 62 and 68 by close contact thereof. To complete this referencing arrangement, the alignment posts 66 are accurately positioned relative to the lower bosses 68, and engage in appropriate apertures 69 (FIG. 3) in the inner member (such as 16b) on each of the receivers, such aperture being very accurately sized with respect to the diameter of the alignment posts, which are slightly tapered to provide a self-centering function. In this manner, a disc assembly 60 within the receivers will be accurately positioned relative to the drive hubs 28, 30, so that very little additional centering of the recording disc upon the hub is necessary to provide for proper rotary driving of the disc by the hub.

As illustrated in the various figures, the drive motor 18 has a drive hub or pulley 19 on its shaft, and a flexible drive belt 21 couples hub 19 to hub 22 on jack shaft 20. On the opposite side of the latter, hub 24 is coupled by a similar drive belt 25 to an interior hub portion (not shown) of the disc-driving hubs 28 and 30. Consequently, driving motion of the motor rotates both of the disc-driving hubs 28 and 30.

Each of the opposite side plates such as 16a, 16b of the disc-receivers has a pair of sizeable lateral openings therethrough, a first such opening 70 (FIG. 1) being circular in shape and providing access to the center of the disc for clamping the same against the drive hubs 28 and 30, and the second such opening 72 being generally rectangular in shape and providing access to the disc through an elongated opening 56 (FIGS. 1 and 5) in the sides of the envelope which encloses the flexible recording disc 58, itself, the disc and the envelope constituting the aforementioned disc assembly 60.

To provide for convenient opening of the disc-receivers, the frame rotatably mounts a pair of shafts 46a, 46b (FIGS. 2 and 3), on which are mounted opening cams 48a, 48b, such that rotation of the control shafts forces the cam involved against the adjacent disc-receiver, opening the latter against the tension of an appropriate closing spring (not shown).

The rectangular opening 72 in each of the disc-receivers, mentioned previously, has a pair of spaced, parallel guide rods 74, 76 (FIGS. 1 and 5) mounted across it, in a manner which provides three spaced, rectangular openings 78, 80 and 82 above, between and below the guide rods. The guide rods cooperatively operate with a carrier member to provide a head position referencing means, as further described hereinafter. The rectangular opening 72 in the disc-receivers extends through both side portions 16a, 16b thereof, (FIG. 5), and guide rods 74, 76 have counterparts 74a, 76a mounted on the inside plate portion 16b (or 14b) of each disc-receiver. The guide rods provide accurate referencing relative to the disc-receivers on which they are mounted. Each guide rod slidably supports a magnetic head-carrier block 84, upon which a magnetic head 86 is rigidly supported, as by screws extending upwardly into the head from the underside of the head carrier. Each of the head carriers 84 has a rectangular guideway 88 in its underside which fits over the lower guide 76 and also includes a flat vertical surface 90 which bears flush against the side of guide rod 76. Similarly, the top portion of the carrier block 84 has a flat vertical guide surface 92 which bears flush against the side of the upper guide rod 74. These surfaces provide accurate position references for the recording head 86 relative to the recording disc 58 which is completely independent from either the frame 12 or any of its various parts as well as from the head translational drive apparatus, e.g., the worm 32, etc.. Such position references are very important to successful recording and reproducing operation, inasmuch as they establish the depth of penetration of the curved face of head 86 into the plane of flexible disc 58. The parameters of such penetration, (i.e., depth and angle of head) are very important factors in obtaining suitable recording on a flexible disc. The inner surface 94 of each disc-receiver 14, 16 is accurately referenced to the outer surfaces of guide rods 74 and 76. The vertical guide surfaces 90 and 92 on carrier block 84 are, accordingly, also accurately referenced to the inner surface 94 of the disc-receivers to thereby control the depth of penetration of the head.

As so positioned upon the guide rods 74, 76, head carrier 84 is thus rockable upon the lower guide 76, toward and away from (i.e., "angularly" with respect to) the disc-receiver and the disc positioned within the latter; at the same time, the head carrier is slidable along the guide rods, both when tilted toward and away from the recording disc. However, it is to be noted that the desirable position-referencing feature provided in accordance herewith is obtained regardless of whether or not the head carrier is actually rocked or otherwise moved upon its guide bar; that is it is certainly possible, if desired, to dispense with the feature of head width and by such rocking movement and merely retain the head carrier upon the guide rails or bars in a slidable but not rockable manner, thereby eliminating the solenoid and other parts involved while nonetheless taking full advantage of the head-positioning feature, and its independence from the other parts of the apparatus, which advantage is still provided under such circumstances. The tilting or rocking movement of the head carrier is determined by operation of a solenoid 96 mounted above the latter and responsive to energization by moving a control arm 98 inwardly and outwardly with respect to the disc-receiver. Attached to the lower extremity of control arm 98 (or integral therewith) is a first actuator portion 100 comprising an elongated stiffly resilient flap-like element loosely disposed within a rectangular notch or guideway in the top of the head carrier block 84. Also attached to the lower end of control arm 98 is a resilient second actuator 102, comprising a resiliently flexible sheet metal or like spring member which bears against a round protrusion 104 on the outer or rear side of the head carrier. Thus, when the solenoid pulls in upon being energized, the more rigid actuator 100 will operate to move carrier block 84 into generally vertical position near contact with both guide rods, but the resilient actuator 102 will push directly against protrusion 104 and spring-load surfaces 90 and 92 of carrier block 84 against both upper and lower guide bars 74 and 76 thereby bringing the head 86 into referenced transducing position. Conversely, when the solenoid is de-energized, outward excursion of the control arm 98 will move the resilient actuator 102 away from the back of carrier block 84 and, at the same time, move the first actuator within the slot at the top of the carrier block and against the upper portion thereof, tipping the carrier block back into the position shown at the right in FIG. 5, in which head 86 is fully out of transducing relation with the disc.

As stated above, each of the disc-receivers 14, 16 may carry a pair of transducing heads, each mounted in a separate carrier block 84 supported on its own guide rods, with separate actuating solenoids for each. Thus, each disc may be recorded on either side, to give selectable four-way recording or reproducing operation. Of course, fewer numbers of recording heads may also be used, for example, only one on each disc-receiver, in which the discs may be physically reversed to provide for opposite-side recording, while realizing certain economics by the elimination of two complete recording heads and all of the associated elements and read-write electronics.

The head carriers and the transducing heads mounted thereon are subjected to sliding movement upon guide rods 74 and 76, thereby imparting translational or traversing movement to the transducing heads radially across the face of the recording discs, i.e., in either lateral direction within the elongated radial slot 56 in the disc envelope. This translational movement is obtained in a novel manner in accordance herewith by coupling the head carriers 84 to the translator or follower 50, the latter being threadably mounted on the lead screw or worm 32 as described above.

Figure 4:
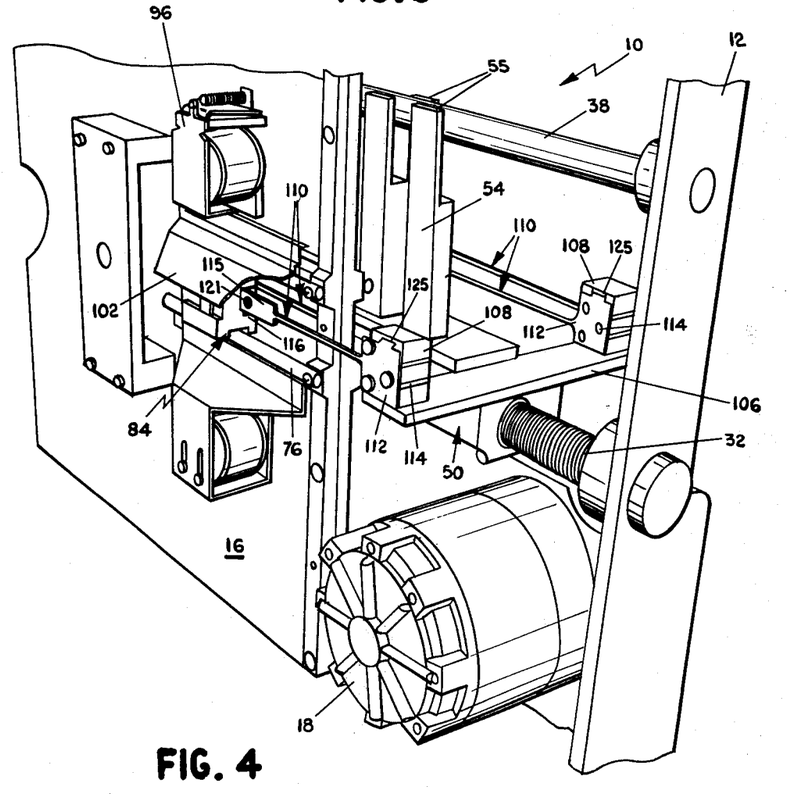
FIG. 4 is a fragmentary side perspective view of the apparatus of FIGS. 1 and 2 showing other details thereof.

More particularly, follower 50 has a transverse arm 106 (FIG. 4) having an upstanding leg portion 108 at either end, disposed generally in alignment with each of the disc-receivers. To each opposite side of these upstanding leg portions is secured one end of a stiffly flexible head-positioning link arm 110 (FIGS. 1, 4 and 6), which may be formed of stainless steel or the like, such member including an integral mounting plate 112 at one end which is attached by screws 114 or the like to the ends 108 of transverse arm 106. The opposite ends of each arm 110 is provided with an integral mounting pad 115. Screws 121 passing through an opening 119 in pad 115 are attached to a laterally-extending tab portion 116 forming a part of the head carrier 84. The mounting plate end 112 of link arm 110 is equipped with a series of elongated adjustment slots 123 to receive screws 114.

Figures 5, 6:
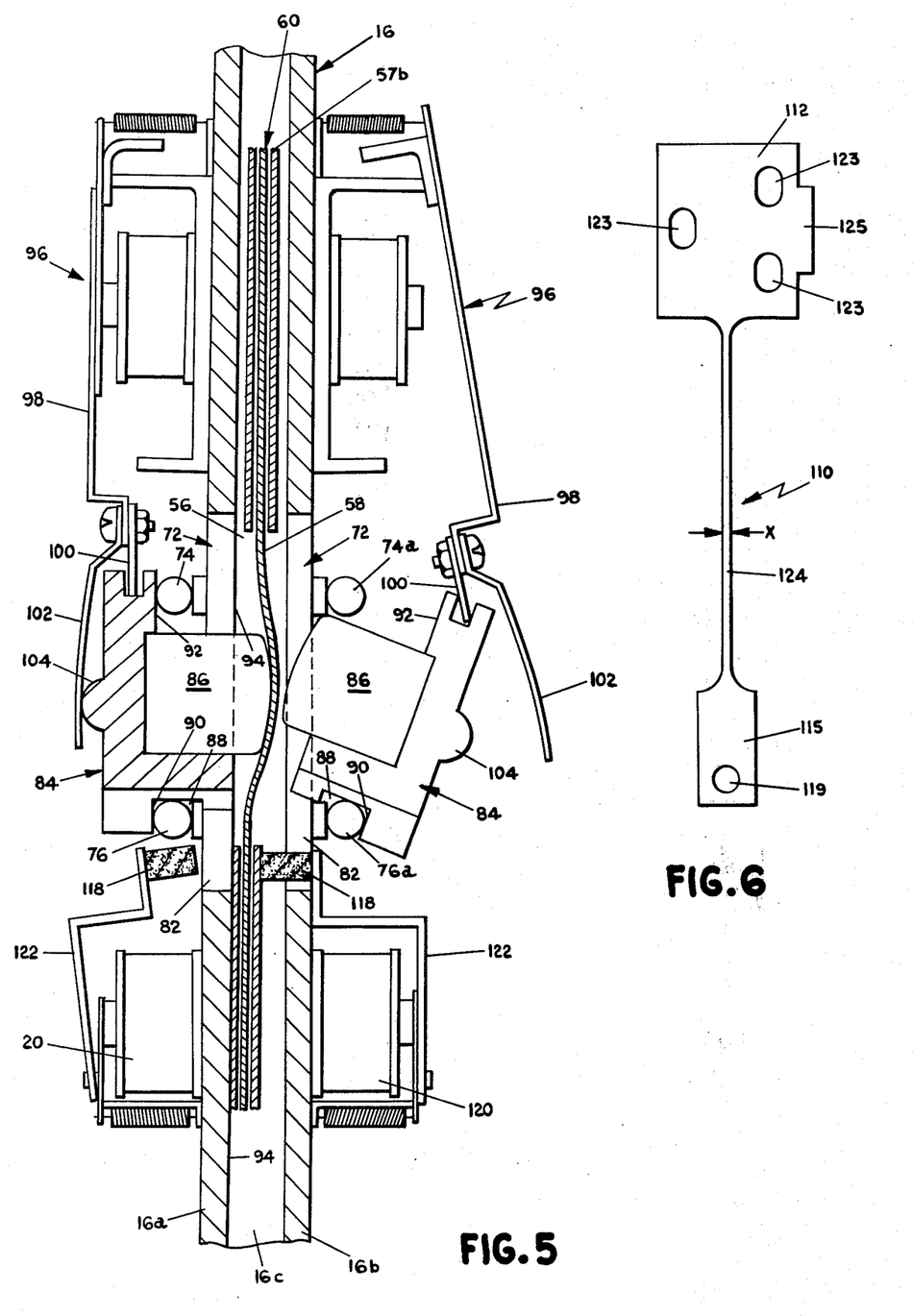
FIG. 5 is an enlarged, fragmentary sectional elevation taken through the plane V—V of FIG. 1, showing a pair of magnetic heads, one in transducing position and the other moved into non-transducing position.
FIG. 6 is an enlarged plan view of the linking means.

The arm 110 is preferably formed of type 302 stainless steel having a nominal thickness of 0.020 inches. The width of the elongated thin section 124 connecting plate 112 and pad 115 is preferably about 0.035 inches as indicated by the reference dimension "X" (FIG. 6). The cross sectional area at the thin connection 124 thus may be in a range of from about 0.0004 to about 0.0009 square inches. Arm 110 may be produced by the etching process although other conventional manufacturing techniques may also be utilized.

A tab member 125 extending outwardly from plate 112 is provided for engagement with a tool such as a screwdriver, such that when screws 114 are loosened, plate 112 and thus head assembly 86 may be shifted with respect to follower 50. Alternately, narrow section 124 of link arm 110 may be formed of stainless steel music wire or the like, in such case the wire should have a cross sectional area approximating that described above and may be secured as by welding between plate 112 and mounting pad 115.

The effective length of each link arm 110 associated with each head 86 is adjusted such that the relative position of the head with respect to their associated disc are in the same data-transducing position. Toward this end, the relative spacing between the heads and associated carrier i.e. the relative length of arm 110 may be adjusted as required by releasing screws 114 and adjusting the plate 112 by movement along slots 123 with respect to ends 108 of transverse arm 106.

With the structure just described, the head carrier, and thus the recording head itself, is incrementally positionable along the guide bars with all requisite accuracy relative to the motion translator, or follower, 50 and thus relative to the worm itself, since the length of the head linking arm 110 serves as an indexing tool, pushing or pulling the head and precisely carrier prcisely in relation to movements of the follower 50 in response to driven rotation of the worm. That is, the rigidity of the head linking arms is sufficient to push or pull the attached head carriers 84 along the guide bars and across the face of their respective discs. At the same time, the torsional and bending flexibility of the head linking arms allow the head carriers and their respective recording heads to undergo the limited movement required in tilting or rocking the same upon the guide bars 74 and 76 in the manner shown in FIG. 5, into and out of transducing position, while, at the same time, consistently returning to the same relative tracking position and also being freely movable across the face of the disc as a result of movement by the translator 50 in response to stepped rotation of the lead screw or worm 32. Further, as may be seen in FIG. 3, upon opening of the disc-receiver doors, the flexibility of the head linking arm 110 allows the latter to bow elastically the requisite extent as indicated. Upon opening of the disc-receiver doors, the head carrier will slide along guide bars 74 and 76, slightly as it bows, as required. When the doors are closed, the head carrier will return to its original position.

In order to assure proper transducing proximity of the transducing head with flexible disc 58, a pressure pad such as that shown at 118 (FIG. 5) may be utilized to force the disc toward and/or against the transducing head. Other pressure pad arrangements, generally known to the art, may also be utilized. To actuate a pressure pad such as pad 118, a second solenoid 120 may be mounted below the lower guide bar 76, with an upstanding control arm 122 which carries the pressure pad at its top, such pad being made of elastomeric foam or the like. Pressure pad 118 is generally coextensive with the lower rectangular opening 82 beneath guide bar 76, but is sufficiently smaller than the latter to fit through it when control arm 122 is moved upon energization of solenoid 120. Thus, when the head carrier 84 on one side of a recording disc is moved into transducing position, indexed against guide rails 74 and 76, the pressure pad 118 on the opposite side of that disc is moved into position by actuation of its controlling solenoid. When so actuated, the pressure pad moves inside the disc-receiver and against the flexible disc envelope 57b, squeezing the entire disc assembly 60 against the opposite interior surface face 94 of disc-receiver 16a. In this position, the flexible disc 58 will typically form a traveling, dimple-like deformation around the curving face of the transducer head, which typically penetrates the plane of revolution of the disc, the depth of penetration being accurately controlled by the referencing means previously described. In this manner, the required relationship is established between the flexible disc and the face of the recording head for proper transducing operation.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. In a data recorder/reproducer device for use with disc-type recording media and having a disc-mounting means for supporting such a recording disc in predetermined position, further having a transducing head for proximately engaging and transducing signals recorded on such a disc, a rotary drive means for rotating such a disc, and translational drive means coupled to said transducing head to move the same laterally along a disc so positioned, the improvement comprising: referencing means laterally adjacent the positioned disc for establishng a predetermined transducing proximity relationship between said head and such a disc; said referencing means including reference guide means disposed generally along at least one side of such a disc, generally parallel to and spaced laterally from a radius thereof; carrier means supporting such head for guided and positioned movement along said guide means; and flexible linking means connected between said carrier means and said transitional drive means, said linking means being sufficiently rigid in tension and compression to pull or push said carrier and thus said head, to move the head along the side of such disc in response to movements of said translational drive means with substantial bending or bowing of the linking means, and said linking means also being sufficiently flexible to elastically flex and to thereby permit said head to be moved laterally relative to the disc and the normal transducing position of the head as established by said guide means, without permanent deformation of said linking means.

2. The apparatus of claim 1 including a first guide surface with a position substantially parallel to the plane of rotation of said disc, and a second guide surface substantially parallel to said first surface, and a support for holding said head and moving it along said first and second surfaces during translational movement of the head across the disc, at least one of said guide surfaces being spaced a predetermined distance from said plane of rotation to thereby position said head with respect to said plane during said translational movement.

3. The apparatus of claim 2 including a guide member defining said first surface, said guide member mounted upon a portion of said means mounting said disc.

4. The apparatus of claim 3, including means mounting said head for sliding movement on said guide, said linking means being connected to said head-mounting means.

5. The apparatus of claim 3 wherein said disc mounting means includes an envelope-like structure for receiving said disc, frame means mounting said translational drive means, said envelope-like structure being hingedly mounted upon said frame means for movement between disc-receiving position and a disc-driving and transducing position; said linking means being elastically bendable to accomodate movement of said envelope-like structure with respect to said frame means between said two positions.

6. The apparatus of claim 4 wherein said linking means comprises a length of wire-like material having attachment means at each end thereof.

7. The apparatus of claim 4 wherein said linking means is integrally formed from a single workpiece.

8. The apparatus of claim 5 wherein said linking means has a long thin part having a cross sectional area of from about 0.0004 to about 0.0009 square inches.

9. The apparatus of claim 1, wherein said apparatus has at least a pair of said magnetic heads, each said head being mounted for selective movement toward and away from the plane of rotation of the same such recording disc, and flexible linking means connecting each said head to a common translational drive means, and including means carrying a pair of said discs for rotation in separate predetermined planes, means on each of said carrying means for positioning a pair of heads with respect to said planes of rotation to establish transducing relationship with a selected side of each said disc; said head-positioning means having first reference surfaces thereon adjacent said plane of rotation and second reference surface means spaced from said first reference surfaces; support structure for each of said heads on said second reference surface, means supporting each said head for translational movement along a respective disc; said support structure being spaced a predetermined distance from said first surfaces to thereby position each said head in transducing relation with respect to said plane of rotation.

10. The apparatus of claim 9, wherein said support structure includes a guide element mounted on said second reference surface means on at least one side of said disc, said guide members extending generally parallel to a radius and outwardly from the central part of each disc, and carrier means mounting each said head for movement along one of said guide elements, said linking means being connected to said carrier means and to said drive means.

11. The apparatus of claim 10, wherein said disc-mounting means includes an envelope structure for receiving each disc; a frame mounting said translational drive means, said envelope structure and said frame being hingedly connected for pivotal movement of the former between a disc-receiving position and a non-receiving transducing position, said linking means connecting said drive means and said head-mounting means bowing elastically to accommodate relative movement of said envelope structure and said frame between said two positions thereof.

12. In a disc data recorder/reproducer device for use with flexible disc recording media and having disc-receiver means defining a narrow receptacle for receiving such a recording disc and supporting the same in predetermined position therein and means for access to the side of the disc therein, and further having a magnetic head for proximately engaging and transducing signals recorded on such a disc, a rotary drive means for rotating such a disc, and translational drive means coupled to said magnetic head to move the same laterally of a disc which is proximate thereto, the improvement comprising: referencing means for positioning said head in transducing relationship with said disc, said referencing means including guide means extending generally parallel to said narrow receptacle and having a bearing surface thereon spaced a predetermined distance from a disc in said disc-receiving means, carrier means for said head, said carrier means having a guide surface thereon adapted for movement along said bearing surface, said bearing surface and said guide surface cooperatively positioning said head with respect to said disc.

13. The improvement of claim 12, wherein said guide means includes at least one elongated surface portion of said disc-receiver means.

14. The improvement of claim 13 wherein said guide means includes at least one elongated element fixed on the outside of said disc-receiver means.

15. The improvement of claim 12 wherein said guide means includes a pair of spaced elongated members extending generally parallel to each other, a bearing surface on each said elongated member spaced from said disc, said carrier means including a pair of said guide surfaces, one of said pair being adapted for sliding engagement with said bearing surface on one of said pair of elongated members, the other of said pair of said guide surfaces being adapted for abutting and sliding engagement with the bearing surface on the other of said elongated members.

16. The improvement of claim 13 and further including linking means coupling said carrier means to said translational driving means, said linking means comprising a thin elongated member, said member being generally non-flexing in compression and tension for moving said head along said guide means surface without substantial bending and being flexible in torsion or bending whereby said head is movable away relative to said side surface.

17. The apparatus of claim 16 and further including frame means supporting said disc-receiver means and said drive means, said disc receiver means and said frame means being hingedly connected for movement of the former between disc-receiving position and a non-receiving transducing position, said linking means bowing elastically to accomodate movement of said disc-receiver means and said frame between said two positions.

18. The apparatus of claim 16 wherein said linking means has a wire-like portion.

19. The apparatus of claim 18 wherein said linking means comprises a length of wire-like material having attachment means at each end thereof.

20. The apparatus of claim 16 wherein said linking means is integrally formed from a single piece of stock.

21. The apparatus of claim 15, wherein one of said elongated members and one of said carrier means guide surfaces cooperatively define a support upon which said carrier means is movable laterally away from said disc to move the head out of transducing relation therewith, said other elongated member and carrier means guide surface disengaging upon such lateral movement.

22. The apparatus of claim 21, and including remotely actuable means for imparting said lateral movement to said carrier means.

23. The apparatus of claim 21, and including means for holding said other elongated member and said carrier means guide surface adjacent one another to prevent undesired such disengagement.

24. The apparatus of claim 23, wherein said means for holding comprises resilient biasing means.

25. In a disc data recorder/reproducer device for use with flexible disc recording media and having disc-receiver means defining a narrow receptacle for receiving such a recording disc and supporting the same in predetermined position therein, and having means for access to the side of the disc therein, having a magnetic head for proximately engaging and transducing signals recorded on such a disc, a rotary drive means for rotating such a disc, and translational drive means coupled to said magnetic head to move the same laterally of a disc which is proximate thereto, the improvement comprising: means for movably supporting said head upon said disc-receiver means; and means for positioning said head in transducing relationship with a disc received and retained by said disc-receiver means.

26. The apparatus of claim 25, wherein said head is mounted upon and carried by said disc-receiver.

27. The apparatus of claim 26, wherein said disc-receiver includes a movable member and said head is mounted upon and carried by said movable member for movement therewith.

28. The apparatus of claim 26, wherein said head is mounted upon and carried by said disc-receiver for movement relative to the latter.

29. The apparatus of claim 28, wherein said disc-receiver includes a movable member and said head is mounted upon and carried by said movable member for movement therewith carried by said disc-receiver for movement relative to the latter.

30. In a data recorder/producer device of the type using disc-type recording media, including means mounting said disc for rotation in a predetermined plane, at least one transducing head for recording or reproducing operation on said disc, means for selective movement of said head toward and away from the plane of rotation of said disc and angularly relative thereto, and translational drive means for moving said head laterally across said disc, the improvement comprising: means linking said translational drive means and said head, said linking means being sufficiently rigid in tension and compression to push or pull said head and thereby move it along beside such disc in response to movements of said drive means without substantial bending or bowing of the linking means, and said linking means also being flexible in both bending and torsion, said linking means responding to said angular head movement by elastically flexing through bending or twisting to thereby permit said head to move angularly in either of two mutually orthogonal directions, or combinations thereof, away from the normal transducing position of the head and the plane of the disc, without permanent deformation of said linking means.

31. The apparatus of claim 30 including carrier means mounting and carrying said head laterally along and generally parallel to said disc, said linking means being connected to said carrier means.

32. The apparatus of claim 31, wherein said means for selective movement of said head toward and away from the plane of disc rotation includes means contacting and acting upon said carrier means to move the same and thereby move said head and flex said linking means.

* * * * *

UNITED STATES PATENT AND TRADEMARK OFFICE
CERTIFICATE OF CORRECTION

PATENT NO. : 3,973,274
DATED : August 3, 1976
INVENTOR(S) : Samuel A. Morgan

It is certified that error appears in the above-identified patent and that said Letters Patent are hereby corrected as shown below:

Col. 7, line 21;
"precisely" should be --- its ---;

Col. 7, line 22;
"prcisely" should be --- precisely ---;

Signed and Sealed this

Second Day of November 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,973,274
DATED : August 3, 1976
INVENTOR(S) : Samuel A. Morgan

It is certified that error appears in the above-identified patent and that said Letters Patent are hereby corrected as shown below:

Column 8, line 43:

"transitional" should be --- translational ---;

Column 8, line 46:

"with" should be --- without ---.

Signed and Sealed this

Sixteenth Day of May 1978

[SEAL]

Attest:

RUTH C. MASON
Attesting Officer

LUTRELLE F. PARKER
Acting Commissioner of Patents and Trademarks